United States Patent
Attar et al.

(10) Patent No.: US 9,578,257 B2
(45) Date of Patent: Feb. 21, 2017

(54) GEOMETRICALLY DISTORTED LUMINANCE IN A MULTI-LENS CAMERA

(71) Applicant: LinX Computational Imaging Ltd., Caesarea (IL)

(72) Inventors: Ziv Attar, Zihron Yaakov (IL); Chen Aharon-Attar, Zihron Yaakov (IL)

(73) Assignee: LinX Computational Imaging Ltd., Caesarea, IL (US)

( * ) Notice: Subject to any disclaimer, the term of this patent is extended or adjusted under 35 U.S.C. 154(b) by 0 days.

(21) Appl. No.: 14/703,715

(22) Filed: May 4, 2015

(65) Prior Publication Data

US 2016/0057361 A1  Feb. 25, 2016

Related U.S. Application Data

(63) Continuation of application No. 13/881,118, filed as application No. PCT/NL2011/050723 on Oct. 24, 2011, now Pat. No. 9,025,077.

(Continued)

(51) Int. Cl.
*H04N 5/262* (2006.01)
*H04N 5/222* (2006.01)
(Continued)

(52) U.S. Cl.
CPC .......... *H04N 5/2621* (2013.01); *H04N 5/2226* (2013.01); *H04N 5/2254* (2013.01);
(Continued)

(58) Field of Classification Search
CPC .. H04N 5/2226; H04N 5/23229; H04N 5/262; H04N 5/2621; H04N 5/232; H04N 5/3532; H04N 9/097; H04N 5/2254; H04N 9/045
See application file for complete search history.

(56) References Cited

U.S. PATENT DOCUMENTS

| 4,890,905 A | 1/1990 | VanRosmalen |
| 5,347,340 A | 9/1994 | Tsukada |

(Continued)

FOREIGN PATENT DOCUMENTS

| EP | 1206126 A2 | 5/2002 |
| EP | 2336816 A2 | 6/2011 |

(Continued)

OTHER PUBLICATIONS

Horisaki, R. et al., "A Compound-Eye Imaging System with Irregular Lens-Array Arrangement," Proceedings of SPIE, Optics and Photonics for Information Processing II, Awwal, A.A.S. et al. (eds.), Aug. 13-14, 2008, p. 70720G1-70720G-1, vol. 7072.

(Continued)

*Primary Examiner* — Aung S Moe
(74) *Attorney, Agent, or Firm* — Blank Rome LLP

(57) ABSTRACT

Spatial resolution can be improved in multi-lens digital cameras. Each lens can have the same or similar field of view, but can be associated with different geometric distortions defining, for example, a magnification at various field of view portions. A final image can be generated based on an initial image captured by each lens. Luminance information from the magnified portions of the initial images can be combined to form final image luminance information. Chrominance information from the initial images can be combined to form final image chrominance information. The final image can be generated based on the final image luminance information and the final image chrominance information.

20 Claims, 15 Drawing Sheets

Related U.S. Application Data

(60) Provisional application No. 61/406,148, filed on Oct. 24, 2010.

(51) Int. Cl.
  *H04N 5/232* (2006.01)
  *H04N 9/04* (2006.01)
  *H04N 5/353* (2011.01)
  *H04N 5/235* (2006.01)
  *H04N 5/225* (2006.01)
  *H04N 9/097* (2006.01)
  *H04N 5/265* (2006.01)

(52) U.S. Cl.
  CPC ........... *H04N 5/2258* (2013.01); *H04N 5/232* (2013.01); *H04N 5/2351* (2013.01); *H04N 5/23229* (2013.01); *H04N 5/23232* (2013.01); *H04N 5/262* (2013.01); *H04N 5/265* (2013.01); *H04N 5/3532* (2013.01); *H04N 9/045* (2013.01); *H04N 9/097* (2013.01)

(56) References Cited

U.S. PATENT DOCUMENTS

| | | | |
|---|---|---|---|
| 6,115,065 A | 9/2000 | Yadid-Pecht | |
| 6,765,617 B1* | 7/2004 | Tangen | H01L 27/14627 348/340 |
| 6,773,638 B2 | 8/2004 | Kloosterboer | |
| 6,809,766 B1 | 10/2004 | Krymski | |
| 6,898,331 B2 | 5/2005 | Tiana | |
| 6,980,248 B1* | 12/2005 | Suda | H04N 5/2254 348/335 |
| 7,151,259 B2 | 12/2006 | Koch | |
| 7,199,348 B2 | 4/2007 | Olsen | |
| 7,224,384 B1 | 5/2007 | Iddan | |
| 7,233,359 B2 | 6/2007 | Suda | |
| 7,262,799 B2 | 8/2007 | Suda | |
| 7,564,019 B2 | 7/2009 | Olsen | |
| 7,620,309 B2* | 11/2009 | Georgiev | H04N 5/23212 348/340 |
| 7,718,940 B2* | 5/2010 | Hirasawa | G03B 15/00 250/201.8 |
| 7,916,181 B2 | 3/2011 | Nilehn | |
| 7,932,941 B2* | 4/2011 | Hayasaka | H04N 5/225 348/264 |
| 8,023,016 B2* | 9/2011 | Iijima | H04N 3/1593 348/262 |
| 8,049,806 B2* | 11/2011 | Feldman | G02B 9/12 257/432 |
| 8,228,417 B1* | 7/2012 | Georgiev | G03B 11/00 348/335 |
| 8,259,212 B2* | 9/2012 | Brady | G02B 3/0056 348/335 |
| 8,290,358 B1* | 10/2012 | Georgiev | G03B 35/10 396/326 |
| 8,315,476 B1 | 11/2012 | Georgiev | |
| 8,345,144 B1 | 1/2013 | Georgiev | |
| 8,436,909 B2* | 5/2013 | Farina | H04N 9/045 348/218.1 |
| 8,471,920 B2 | 6/2013 | Georgiev | |
| 8,514,491 B2 | 8/2013 | Duparre | |
| 8,611,693 B2 | 12/2013 | Intwala | |
| 8,629,390 B2 | 1/2014 | Olsen | |
| 8,749,694 B2 | 6/2014 | Georgiev | |
| 8,760,558 B2 | 6/2014 | Morita | |
| 8,817,015 B2* | 8/2014 | Georgiev | G06T 15/205 345/419 |
| 8,885,059 B1* | 11/2014 | Venkataraman | H01L 27/14618 348/218.1 |
| 2001/0026322 A1* | 10/2001 | Takahashi | H04N 5/2254 348/340 |
| 2002/0067416 A1 | 6/2002 | Yoneda | |
| 2002/0089596 A1 | 7/2002 | Suda | |
| 2002/0122124 A1* | 9/2002 | Suda | H04N 9/093 348/263 |
| 2003/0108240 A1 | 6/2003 | Gutta | |
| 2003/0234907 A1* | 12/2003 | Kawai | H04N 3/1593 351/206 |
| 2004/0047518 A1 | 3/2004 | Tiana | |
| 2004/0080661 A1 | 4/2004 | Afsenius | |
| 2004/0109004 A1 | 6/2004 | Bastos | |
| 2004/0201748 A1 | 10/2004 | Goldstein | |
| 2005/0052751 A1 | 3/2005 | Liu | |
| 2005/0128323 A1 | 6/2005 | Choi | |
| 2005/0128335 A1 | 6/2005 | Kolehmainen | |
| 2005/0128509 A1* | 6/2005 | Tokkonen | H04N 9/045 358/1.15 |
| 2005/0134699 A1* | 6/2005 | Nagashima | G02B 13/0055 348/218.1 |
| 2005/0160112 A1 | 7/2005 | Makela | |
| 2005/0225654 A1 | 10/2005 | Feldman | |
| 2005/0259169 A1 | 11/2005 | Ito | |
| 2005/0270395 A1 | 12/2005 | Yoneda | |
| 2006/0003328 A1* | 1/2006 | Grossberg | G06T 3/4053 435/6.11 |
| 2006/0055811 A1* | 3/2006 | Frtiz | G02B 26/06 348/340 |
| 2006/0108505 A1 | 5/2006 | Gruhlke | |
| 2006/0125936 A1* | 6/2006 | Gruhike | H04N 9/045 348/238 |
| 2006/0193509 A1 | 8/2006 | Criminisi | |
| 2007/0075218 A1* | 4/2007 | Gates | H04N 3/155 250/208.1 |
| 2007/0091197 A1* | 4/2007 | Okayama | G02B 3/0056 348/340 |
| 2007/0153086 A1 | 7/2007 | Usui | |
| 2007/0177004 A1 | 8/2007 | Kolehmainen | |
| 2007/0189748 A1 | 8/2007 | Drimbarean | |
| 2007/0211164 A1 | 9/2007 | Olsen | |
| 2007/0252074 A1* | 11/2007 | Ng | G02B 3/0056 250/208.1 |
| 2007/0252908 A1 | 11/2007 | Kolehmainen | |
| 2007/0258006 A1 | 11/2007 | Olsen | |
| 2008/0068452 A1* | 3/2008 | Nakao | G02B 3/0075 348/36 |
| 2008/0079839 A1 | 4/2008 | Sung | |
| 2008/0084486 A1 | 4/2008 | Enge | |
| 2008/0218611 A1 | 9/2008 | Parulski | |
| 2008/0219493 A1 | 9/2008 | Tadmor | |
| 2008/0240508 A1 | 10/2008 | Nakao | |
| 2008/0278610 A1 | 11/2008 | Boettiger | |
| 2009/0021612 A1 | 1/2009 | Hamilton | |
| 2009/0103792 A1 | 4/2009 | Rahn | |
| 2009/0140131 A1 | 6/2009 | Utagawa | |
| 2009/0262987 A1 | 10/2009 | Ioffe | |
| 2009/0321861 A1 | 12/2009 | Oliver | |
| 2010/0020078 A1 | 1/2010 | Shpunt | |
| 2010/0021064 A1 | 1/2010 | Lee | |
| 2010/0039713 A1 | 2/2010 | Lusinchi | |
| 2010/0052192 A1 | 3/2010 | Hasegawa | |
| 2010/0085468 A1* | 4/2010 | Park | H04N 5/23296 348/345 |
| 2010/0097491 A1* | 4/2010 | Farina | H04N 9/045 348/223.1 |
| 2010/0117176 A1 | 5/2010 | Uekawa | |
| 2010/0127157 A1 | 5/2010 | Tamaki | |
| 2010/0128137 A1 | 5/2010 | Guidash | |
| 2010/0171866 A1* | 7/2010 | Brady | G02B 3/0056 348/340 |
| 2010/0253833 A1 | 10/2010 | Deever | |
| 2010/0259607 A1 | 10/2010 | Kennedy | |
| 2010/0283837 A1 | 11/2010 | Oohchida | |
| 2011/0019048 A1 | 1/2011 | Raynor | |
| 2011/0069189 A1* | 3/2011 | Venkataraman | H01L 27/14618 348/218.1 |
| 2011/0080487 A1 | 4/2011 | Venkataraman | |
| 2011/0122308 A1* | 5/2011 | Duparre | H01L 27/14621 348/340 |
| 2011/0134282 A1 | 6/2011 | Morita | |
| 2011/0157387 A1 | 6/2011 | Han | |

(56) References Cited

U.S. PATENT DOCUMENTS

| | | | |
|---|---|---|---|
| 2011/0242356 A1* | 10/2011 | Aleksic | H04N 5/2258 348/222.1 |
| 2012/0007942 A1 | 1/2012 | Michrowski | |
| 2012/0140100 A1* | 6/2012 | Shibazaki | H01L 27/14621 348/281 |
| 2013/0002928 A1 | 1/2013 | Imai | |
| 2013/0121615 A1 | 5/2013 | Intwala | |
| 2013/0128087 A1 | 5/2013 | Georgiev | |
| 2013/0293744 A1 | 11/2013 | Attar | |
| 2013/0308197 A1* | 11/2013 | Duparre | H01L 27/14621 359/621 |
| 2013/0321674 A1* | 12/2013 | Cote | H04N 9/64 348/242 |
| 2013/0335598 A1* | 12/2013 | Gustavsson | H04N 5/2351 348/234 |
| 2015/0234151 A1* | 8/2015 | Venkataraman | G02B 13/0015 348/360 |
| 2015/0235371 A1* | 8/2015 | Venkataraman | G06T 7/0051 348/135 |
| 2015/0296193 A1* | 10/2015 | Cote | H04N 9/646 382/167 |

FOREIGN PATENT DOCUMENTS

| | | |
|---|---|---|
| JP | 2000152281 A | 5/2000 |
| JP | 2001078212 A | 3/2001 |
| JP | 2002135795 A | 5/2002 |
| JP | 2002171430 A | 6/2002 |
| JP | 2005109622 A | 4/2005 |
| JP | 2005303694 A | 10/2005 |
| JP | 2006246193 A | 9/2006 |
| JP | 2007158825 A | 6/2007 |
| JP | 2008099329 A | 4/2008 |
| JP | 2010004090 A | 1/2010 |
| JP | 2011109484 A | 6/2011 |
| WO | 0022566 A1 | 4/2000 |
| WO | 03049035 A2 | 6/2003 |
| WO | 2004021264 A1 | 3/2004 |
| WO | 2004027880 A2 | 4/2004 |
| WO | 2006039486 A2 | 4/2006 |
| WO | 2007005714 A2 | 1/2007 |
| WO | 2008085679 A1 | 7/2008 |
| WO | 2008087652 A2 | 7/2008 |
| WO | 2009123278 A1 | 10/2009 |
| WO | 2009151903 A2 | 12/2009 |
| WO | 2010059182 A1 | 5/2010 |
| WO | 2010078563 A1 | 7/2010 |

OTHER PUBLICATIONS

Horstmeyer, R. et al., "Flexible Multimodal Camera Using a Light Field Architecture," 2009 IEEE International Conference on Computational Photography (ICCP2009), IEEE, Apr. 16, 2009, pp. 1-8.
Mirotznik, M. et al. "A Practical Enhanced-Resolution Integrated Optical-Digital Imaging Camera," Proceedings of SPIE, Modeling and Simulation for Military Operation IV, Trevisani, D.A. (ed.), Jan. 2009, pp. 743806-1-743806-9, vol. 7348.

* cited by examiner

GEOMETRICALLY DISTORTED LUMINANCE IN A MULTI-LENS CAMERA

CROSS REFERENCE TO RELATED APPLICATIONS

This application is a continuation of U.S. application Ser. No. 13/881,118, entitled "Geometrically Distorted Luminance In A Multi-Lens Camera," filed on Jul. 8, 2013, which is a national phase application of PCT/NL2011/050723, entitled "System and Method for Imaging Using Multi Aperture Camera," filed on Oct. 24, 2011, which in turn claims priority to U.S. Provisional Application No. 61/406,148, filed on Oct. 24, 2010, the contents of which are all hereby incorporated by reference in their entirety.

BACKGROUND

Technical Field

This disclosure relates to a camera system, and more specifically, to a camera system with multiple lenses, each configured to capture geometrically-distorted image data of a portion of a field of view for use in generating images.

Description of the Related Art

An imaging system typically consists of an imaging lens and an image sensor. An imaging lens collects light emitted or reflected from objects in a scene and directs collected light upon the image sensor. An image sensor is a photosensitive device that converts light incident upon the image sensor during an image capture to an electronic signal representative of the captured light. To obtain color image data, a color filter array (such as a Bayer filter) is used in conjunction with the image sensor to separate between different spectral regions of the total light spectrum of the image being captured. Color filter arrays separate captured light into (for instance) green image planes, red image planes, and blue image planes.

Given an image sensor's active area dimension (the image sensor's "format") and the desired field of view, the focal length of a lens can be calculated. The size of the aperture of the lens can be set according to image sensor's photo sensitivity, exposure time, and noise level tolerance. The focal length divided by the aperture's size is called the "F-number," and indicates the ability of the lens to collect light. Lower F-Numbers are associated with more light being collected by the lens and directed upon the image sensor.

A phenomena caused by the use of color filter arrays is the appearance of color artifacts also caused by the spatial disposition of the different colors. For example, in a captured image of a white line 1 pixel deep on a black background, the white line will appear in various colors depending on the position of the light from the line incident upon the image sensor. Multi-lens systems can be implemented to reduce such artifacts, but can be accompanied by issues of increased system cost and complexity.

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
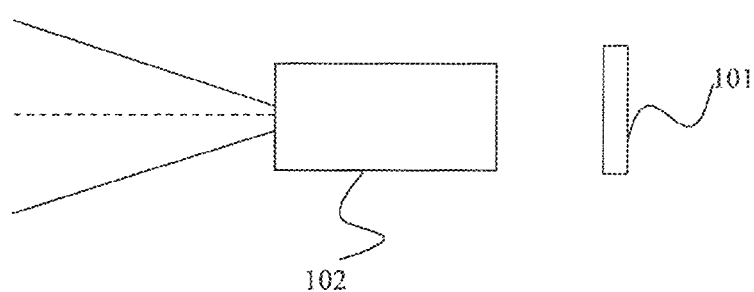
FIG. 1 illustrates a side view of a single lens camera, according to one example embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A multi-lens camera system can improve image luminance by, for each lens, magnifying light collected from a portion of a field of view and directed onto an image sensor. The lens can magnify light collection from a portion of the field of view based on a geometric distortion that defines a light magnification or focal length variation by field of view portion or location. The image sensor captures an image from each lens, and combines the luminance information resulting from the magnified portions of the field of view to produce combined luminance information for a final image. Each lens in such a camera system is associated with a different portion of a field of view, and each portion of the field of view is represented by at least one lens. The term "multi-lens digital camera" or "multi-aperture digital camera" as used herein refers to a camera including more than one lens, each with an aperture and various lens elements. Thus, instead of using a single lens to capture luminance information for a field of view, several smaller lenses can be used, each capturing a magnified portion of the field of view.

Geometrically Distorted Luminance Overview

The multi-lens camera system described herein can overcome the loss of effective resolution originating from the use of multiple lower resolution lenses (as opposed to one higher resolution lens). The multi-lens camera system can improve image spatial resolution using a multi lens digital camera, each lens having a different geometric distortion as a function of field of view. Each lens in the multi-lens camera system forms an initial image at a different location on the image sensor, and each initial image includes a magnified portion of a field of view. The image sensor then combines the initial image to form a final image.

In one embodiment, each lens is associated with a different geometric distortion as a function of field of view, and is configured to magnify different parts of the image based on the geometric distortion. A geometric distortion associated with a lens is preferably achieved by various optical properties of the lens, such as the lens shape, the lens thickness, the air space thickness, the lens materials, and the lens aperture dimensions.

The multi-lens camera system can include one or more color filters, polarized filters, chromatic filters, and neutral density filters integrated within the system configured to filter collected light prior to capture by the image sensor. Each initial image can have a different light intensity from other initial images. The camera system can include an algorithm for adding initial images to form a final image having higher dynamic range than the initial images. Each lens in the multi-lens camera system can have a different F-Number than the other lenses, and can be focused to a different distance than the other lenses.

In one embodiment, the multi-lens camera system described herein is configured to: 1. select a magnified portion of each initial image associated with a portion of a field of view, 2. correct the magnified portions of the initial images, and 3. combine the corrected portions of the initial images to form a final image. The final image can have a higher resolution than any of the initial images, thus allowing lower resolution lenses to produce an image of similar quality to a higher resolution lens.

In one embodiment, the multi-lens camera system described herein is configured to: 1. correct the magnified portions of the initial images, 2. select an area of interest one or more of the corrected images corresponding to the magnified portions of the initial images, 3. combine the initial image luminance information of the selected areas of interest to form final image luminance information, 4. combine the initial image chrominance information to form final image chrominance information, and 5. combining the final image luminance information and the final image chrominance information to form a final image.

Each magnified portion of an initial image can be of a higher resolution than the remainder of the initial image. The final image luminance information can be a luminance matrix including the luminance information of each selected area of interest of the corrected images. The final image chrominance information can be a chrominance matrix including the chrominance information of each corrected image. Accordingly, the final image can be created by combining the luminance matrix and the chrominance matrix. It should be noted that the methods described herein can additionally include upscaling the initial images, for instance before or after the magnified portions of the initial images are corrected.

In one embodiment, the camera system described herein is configured to: 1. correct the geometric distortion of initial images captured from one or more lenses, 2. select an area of interest corresponding to a geometrically distorted portion of at least two initial images, 3. create final image luminance information based on the selected areas of interest, 4. create final image chrominance information from at least two corrected initial images captured with different chromatic filters, and 5. combine the final image luminance information and the final image chrominance information to form a final image. This and other methods described herein can beneficially correct for low light performance of one or more lens in the camera system. The final image luminance information described herein can have a higher signal to noise ratio than the initial image luminance information of one or more initial images.

In one embodiment, the camera system described herein is configured to: 1. determine an amount of light in a scene, 2. select a source of luminance for one or more portions of the final image based on the determined amount of light, and 3. selecting areas of interest of initial images as described herein based on the selected sources of luminance. Such a method allows for the dynamic selection of the source of luminance for a given final image portion, and as such improves the signal to noise ratio of the final image in low lighting conditions. The amount of light in a scene can be calculated by using the exposure time and the pixels signal values associated with one or more initial images.

In one embodiment, the camera system described herein is configured to: 1. select a portion of a field of view, 2. select a source of luminance for the selected portion of the field of view from a plurality of initial images captured by a plurality of lenses, and 3. creating final image luminance information based at least in part on the selected source of luminance as described herein. The methods described herein can result in a higher resolution monochrome image than a monochrome image captured by an individual lens of the multi-lens camera system described herein. The source of luminance can be selected between a broader spectrally filtered initial image that may be corrected for distortion and a chromatically filtered initial image that may be corrected for distortion.

In the multi-lens camera systems described herein, each lens can form an initial image that is smaller than the size of the one or more image sensors. The resulting initial images can have a lower effective resolution than an image captured by a larger lens with a higher effective resolution.

In the multi-lens camera systems described herein, each lens can include an integrated optical barrier for blocking light. Such barriers can be created using, for example, a dicing technique, powder blasting, etching, or scoring techniques. Canals can be created lens optical elements using, for example, dicing techniques. Preferably, the barriers are created within or on top of an image sensor cover substrate.

Optical wafers can have multiple integrated barriers or canals that can be filled with optical absorbing material. The wafer can have multiple canals with surfaces that are coated with absorbing coating. It is also possible to coat different locations on the wafer surface, the coatings at each location configured to transmit a different light spectrum, especially where each location on the wafer is associated with the arrangement of sub images.

The multi-lens camera systems described herein can also include two or more lenses wherein each lens comprises one or more optical elements where some or all have a non circular aperture allowing a decrease in distances between the lenses. The largest lens element in each lens has a footprint which is smaller than the size of the image sensor area that is used to collect the light passing through the same lens. In addition some optical elements have a non circular aperture and others have a circular aperture.

The multi-lens camera systems described herein beneficially allow for increasing the effective resolution of a multi aperture camera without the need of using a sensor with more pixels. The present system thus relates to the use of a multi aperture digital camera having at least two different transfer functions, as a function of field, of lenses of the different imaging channels for improving image spatial resolution.

In one embodiment, the multi-lens camera system relates to the use of a multi aperture digital camera having at least two different transfer functions, as a function of field, of lenses of the different imaging channels for improving low light imaging performance.

In an imaging system containing multi apertures as described above, each lens and the area of the sensor in which the lens forms an image on can be referred to as an imaging channel. The digital camera is composed of two or more imaging channels where the imaging lens of each channel can be different than the imaging lens of other channels.

The focal length of a lens is defined by the distance in which the lens will form an image of an object that is positioned at infinity. The lens F-Number is defined as the focal length divided by the entrance pupil diameter which is set by the lens aperture. The maximal achievable modulation transfer function of a lens with a given F-Number is limited by the diffraction effect.

An ideal lens can have constant magnification and focal length across its field of view, but an actual lens typically demonstrates optical distortion (defined as a change of magnification across the field of view of the lens). For actual lenses with distortion, the focal length is typically defined for the center of the field of view, which can be referred to as 'on-axis'.

Lenses that are rotational symmetric can demonstrate a distortion graph that is symmetric around the optical axis of the lens. Positive distortion at a certain region of the field of view indicates that the focal length at this region is higher than it is at the center of the field of view. Respectively, negative distortion at a certain region of the field of view indicates that the focal length at the said region is shorter than at the center of the field of view.

Each lens of a multi-lens camera system can include a different chromatic filter, or no chromatic filter. Each lens can be designed to have a longer focal length for a portion of the field of view. Using a special algorithm for combining the details captured by all or some of the lenses and their corresponding distorted portions of the field of view can result in a digital image of the field of view with high resolution over the field of view.

The multi-lens camera system described herein can produce a high-resolution final image that composed by extracting portions of initial images corresponding to distorted initial image portions from different lenses. The final image can be a monochrome image. Converting this image into a color image can require the extraction of chrominance information for each pixel or pixel groups from some or all of initial images.

System Overview

The system and method described herein provide high quality imaging while considerably reducing the length of the camera as compared to other systems and methods.

Figure 2:
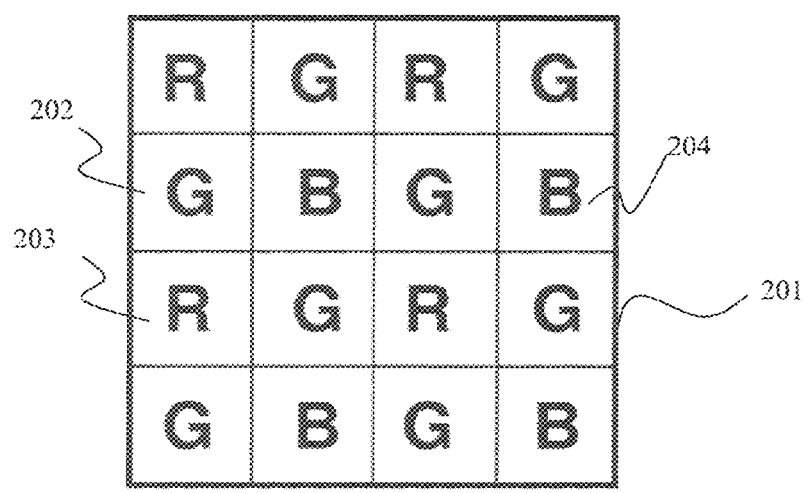
FIG. 2 illustrates a color filter array having multiple pixels, according to one example embodiment.

FIG. 1 illustrates a side view of a single lens camera having a single lens (102) that can include one or more elements and a single sensor (101). FIG. 2 illustrates a sensor array (201) having multiple pixels where the position of the green filter, red filter and blue filter are marked by (202), (203) and (204) respectively. The image that will be taken using this configuration needs to be processed in order to separate the green, red and blue images.

Figure 3:
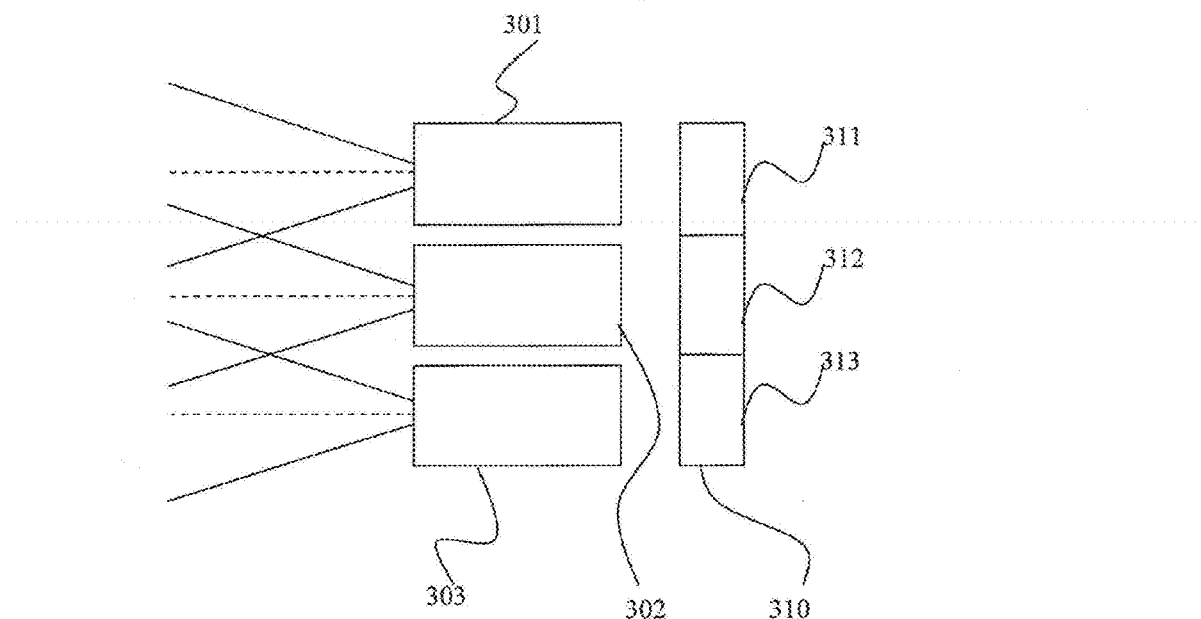
FIG. 3 illustrates a side view of a three lens camera having one image sensor and three lenses, according to one example embodiment.

FIG. 3 illustrates a side view of a three lens camera having one sensor (310) and three lenses (301), (302) and (303). Each one of the said lens will project the image of the same scene on to segments of the sensor marked by (311), (312), and (313) respectively. Each one of the three lenses will have different color filters integrated within the lens, in front of it or between the lens and sensor (310). Using the described configuration the image acquired by the sensor will be composed of two or more smaller images, each imaging information from the scene at different spectrums.

Figure 4:
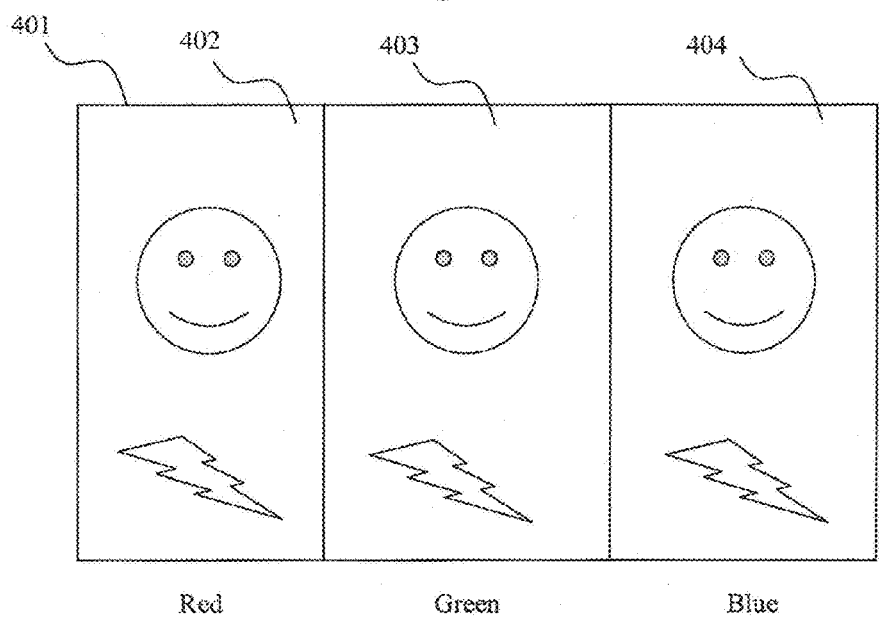
FIG. 4 illustrates an example of a scene as projected on to an image sensor, according to one example embodiment.

FIG. 4 illustrates an example of a scene as projected on to the sensor (401), in each region of the sensor (402), (403) and (404) the same scene is projected but each region will contain information for light at different wavelengths representing different colors according to the filters integrated within the lens that forms the image on each region.

The described configuration does not require the use of a color filter array and therefore the maximal spatial frequency that can be resolved by the sensor can be higher. On the other hand, using smaller lens and smaller active area per channel can result in a smaller focal length of the lens. Therefore, the spatial resolution of objects can be decreased, and the maximal resolvable resolution for each color can remain the same.

The image acquired by the sensor is composed of two or more smaller images, each containing information of the same scene but in different colors. The complete image is then processed and separated in to 3 or more smaller images and combined together to one large color image.

The described method of imaging has many advantages:
1. Shorter lens track (height): Each one of the lenses used can be smaller in size than the single lens covering the same field of view. The total track (height) of each lens can be smaller, allowing the camera to be smaller in height, an important factor for mobile phone cameras, notebook cameras and other applications requiring short optical track.

2. Reduced Color artifacts: Since each color is captured separately, artifacts originating from spatial dependency of each color in a color filter array can be reduced.
3. Lens requirements: Each lens does not have to be optimal for all spectrums used, simplifying the lens design and possibly decreasing the amount of elements used in each lens as no color correction may be needed.
4. Larger Depth of Focus: The depth of focus of a system depends on its focal length. Since smaller lenses are used with smaller focal lengths, the depth of focus is increased by the scale factor, squared.
5. Elimination of focus mechanism: Focus mechanisms can change the distance between the lens and the sensor to compensate for the change in object distance and to assure that the desired distance is in focus during the exposure time. Such a mechanism can be costly and can have many other disadvantages such as increased size, increased power consumption, shutter lag, decreased reliability, and increased price.

Using a fourth lens in addition to the three used for each color red, green and blue (or other colors) with a broad spectral transmission can allow extension of the sensor's dynamic range and can improve the signal-to-noise performance of the camera in low light conditions.

All configurations described above using a fourth lens element can be applied to configurations having two or more lenses.

Another configuration uses two or more lenses with one sensor having a color filter array integrated or on top of the sensor such as a Bayer filter array. In such a configuration no color filter will be integrated in to each lens channel and all lenses will create a color image on the sensor region corresponding to the specific lens. The resulting image will be processed to form one large image combining the two or more color images that are projected on to the sensor.

Dividing the sensor's active area in to 3 areas, one for each of red, green, and blue (for example), can be achieved by placing 3 lenses as illustrated in the figures. The resulting image will include 3 small images containing information of the same scene in a different color.

Figure 5:
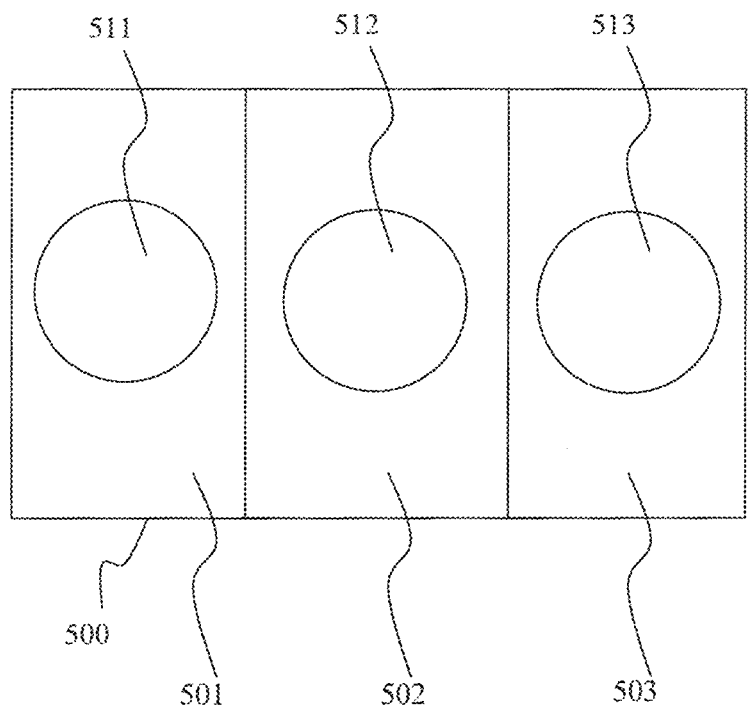
FIG. 5 illustrates a front view of a three lens camera using one rectangular image sensor divided in to three regions, according to one example embodiment.

FIG. 5 illustrates a front view of a three lens camera using one rectangular sensor (500) divided in to three regions (501), (502) and (503). The three lenses (511), (512) and (513) each having different color filters integrated within the lens, in front of the lens or between the lens and the sensor are used to form an image of the same scene but in different colors. In this example each region of the sensor (501), (502) and (503) are rectangular having the longer dimension of the rectangle perpendicular to the long dimension of the complete sensor.

Other three lens configuration can be used, such as using a larger green filtered lens and two smaller lenses for blue and red, such a configuration will results in higher spatial resolution in the green channel since more pixels are being used.

Figure 6:
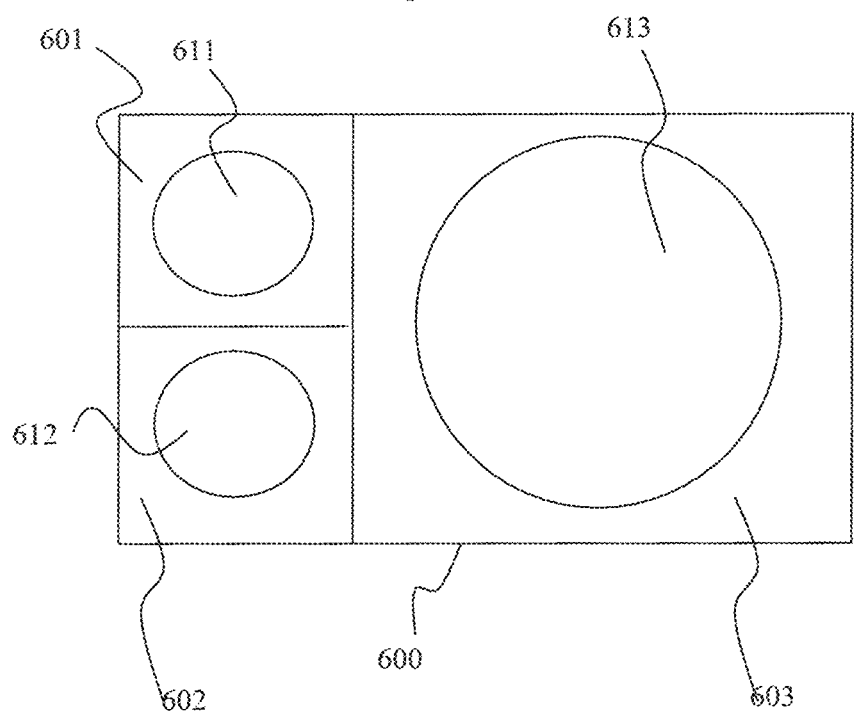
FIG. 6 illustrates a front view of a three lens camera having one image sensor, one large lens and two smaller lenses, according to one example embodiment.

FIG. 6 illustrates a front view of a three lens camera having one sensor (600), one large lens (613) and two smaller lenses (611) and (612). The large lens (613) is used to form an image on the sensor segment marked (603) while the two smaller lenses form an image on the sensor's segments marked with (601) and (602) respectively. The larger lens (613) can use a green color filter while the two smaller lenses (611) and (612) can use a blue and red filter respectively. Other color filters could be used for each lens.

A four lens camera includes 4 lenses each having a different color filter integrated within the lens, in front of the lens, or between the lens and the sensor region corresponding to the lens. The color filter used for two lenses can be the same, resulting in a particular color filter appearing twice among the 4 lenses.

Figure 7:
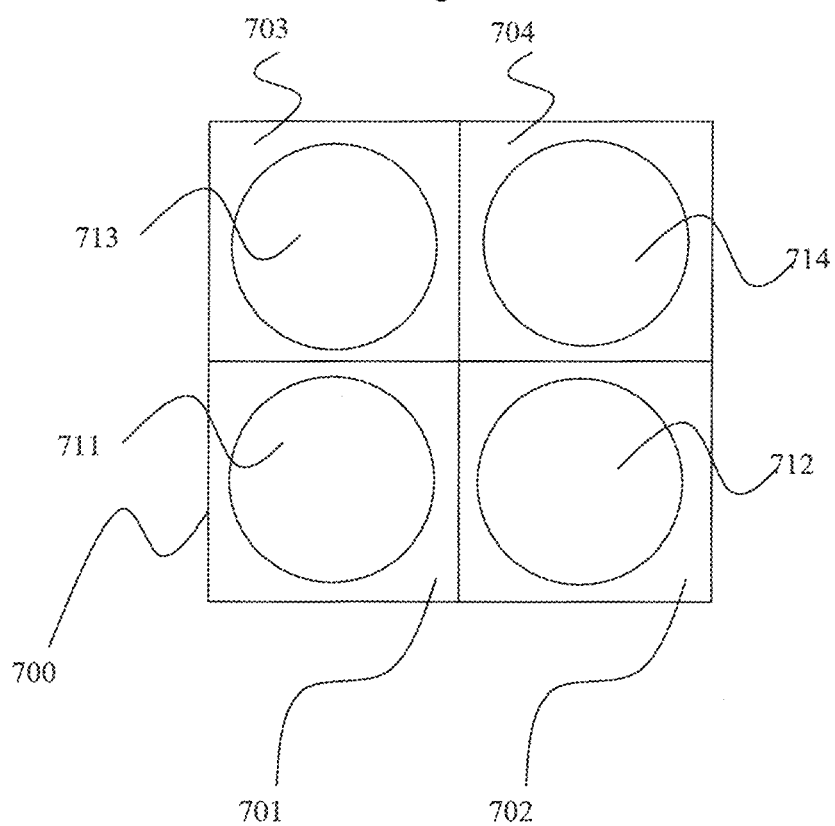
FIG. 7 illustrates a front view of a four lens camera having a one image sensor and four lenses, according to one example embodiment.

FIG. 7 illustrates a front view of a four lens camera having one sensor (700) and four lenses (711), (712), (713) and (714). Each lens forms an image on the corresponding sensor region marked with (701), (702), (703) and (704) respectively. Each one of the lenses will be integrated with a color filter within the lens, in front of the lens, or between the lens and the sensor. All four lenses can be integrated with different color filters, or two of the four lenses can be integrated with the same color filter. For example, two green filters, one blue filter, and one red filter can allow more light collection in the green spectrum.

Figure 8:
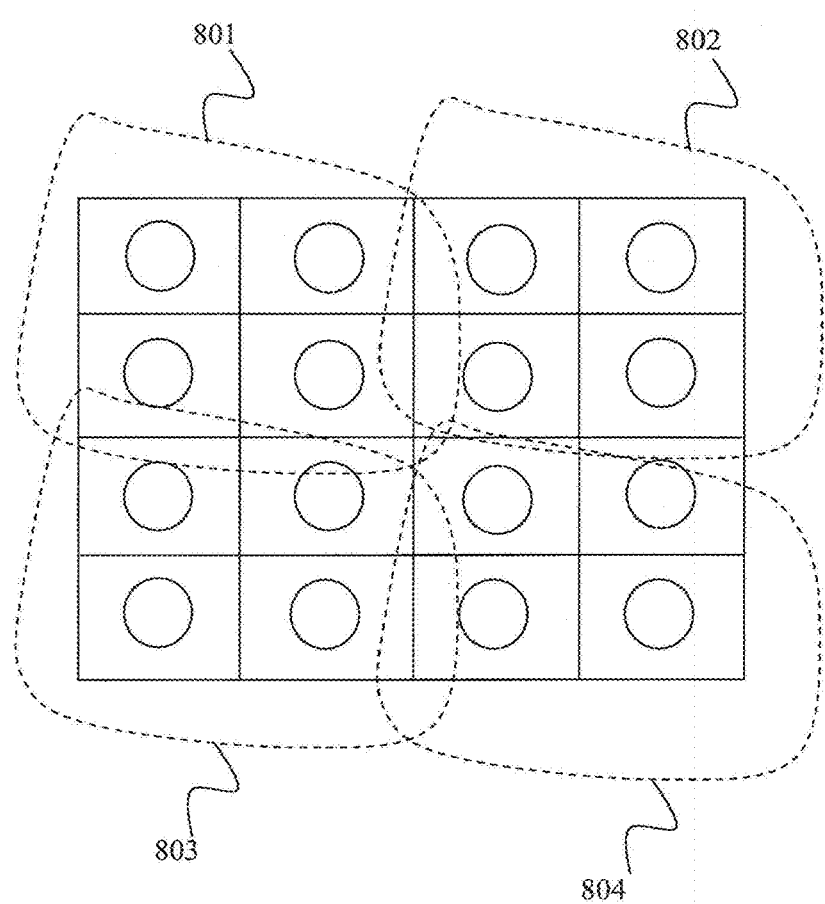
FIG. 8 illustrates a 16 lens camera having four regions, each containing four lenses as illustrated in FIG. 7, according to one example embodiment.

FIG. 8 illustrates a 16 lens camera having 4 regions (801), (802), (803) and (804), each containing four lenses as illustrated in FIG. 7.

Figure 9:
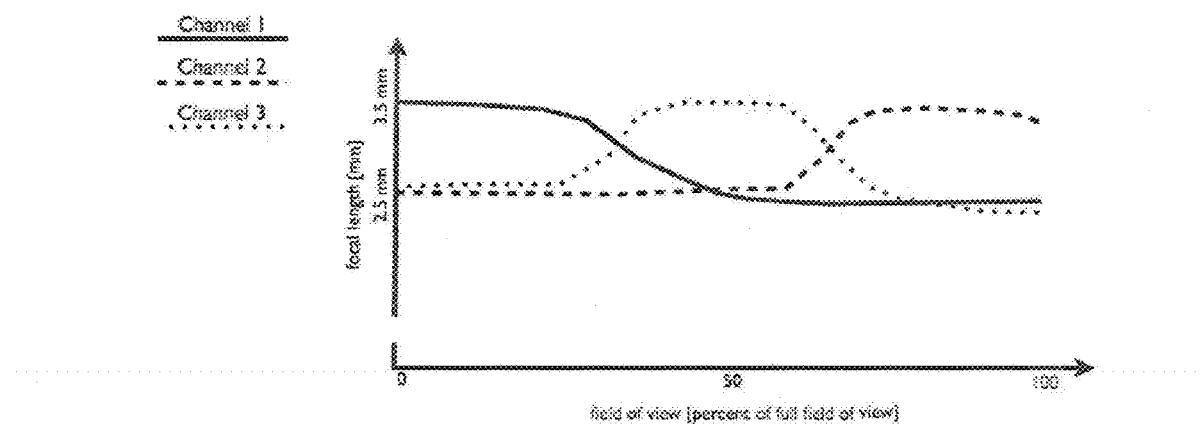
FIG. 9 illustrates the focal length variation as a function of field of view for a three lens camera system, according to one example embodiment.

A camera system with 3 imaging channels can have a different color filter integrated within each imaging channel, one for each of red, green, and blue. All imaging channels have the same diagonal field of view. In this embodiment, the lenses of the imaging channels were designed to have higher magnification at different areas of the image. The higher magnification is introduced by geometrically distorting portions of the image captured by each lens. FIG. 9 illustrates a graph of focal length in which the magnification of each imaging channels is higher at a part of the field of view.

The imaging channel (channel 1 in FIG. 9) including a green color filter demonstrates higher magnification at the center of the field of view, The imaging channel (channel 2 in FIG. 9) including a red color filter demonstrates higher magnification between the central area of the field of view and up to an area close to the corner of the field of view. The imaging channel (channel 3 in FIG. 9) including a blue color filter demonstrates higher magnification at the corner of the field of view.

FIG. 9 illustrates the focal length variation as a function of field of view for the three lenses of the first embodiment. As seen in the graph at any given field of view at least one imaging channel images the scene with a higher focal (and accordingly, a higher magnification).

After capturing images or during image readout, images captured by each lens are corrected for distortion and upscaled by a factor greater than one. A luminance matrix is then created according to one of the two methods:
1. At each area of the final image one or more pixels in size, the source of luminance is chosen from one of the three imaging channels according to a predefined table that for each area selects the source of luminance according to the imaging channel having the highest magnification in the said area, or
2. Comparing sharpness of each area or detail in the three imaging channels and choosing the sharpest one as the source of luminance.

In both cases a chrominance matrix is also created using the distortion-corrected and upscaled images of the three imaging channels.

The luminance and chrominance matrix contain sufficient information as a color image. Converting the luminance and chrominance into other image formats such as RGB, YUV or any other known format is not described here but is a well known procedure.

A camera system with 4 imaging channels can have a different color filter integrated within each imaging channel, one for each of red, green, blue, and white. The white color filter has a wider spectral transmission compared to the other colors. All imaging channels have the same diagonal field of view. In this embodiment, the lenses of the imaging channels that include the red, green, and blue filters were designed to have higher magnification at a different area of the image. The higher magnification is introduced by geometrically distorting portions of the image captured by each lens. FIG. 9 illustrates a graph of focal length in which the magnification of each imaging channels is higher at a part of the field of view. The white channel can have very little or no distortion resulting in a uniform magnification as a function of field of view.

The imaging channel (channel 1 in FIG. 9) including a green color filter demonstrates higher magnification at the center of the field of view. The imaging channel (channel 2 in FIG. 9) including a red color filter demonstrates higher magnification between the central area of the field of view and the area close to the corners of the field of view. The imaging channel (channel 3 in FIG. 9) including a blue color filter demonstrates higher magnification at the corners of the field of view.

FIG. 9 illustrates the focal length variation as a function of field of view for the three lenses of the first embodiment. As seen in the graph at any given field of view at least one imaging channel images the scene with a higher focal length (and accordingly, a higher magnification).

After capturing images or during image readout, images captured by each lens are corrected for distortion and upscaled by a factor of 2. A luminance matrix is then created according to one of the two methods:

1. At each area of the final image that can be one or more pixels in size, the source of luminance is chosen from one of the three imaging channels according to predefined table that for each area selects the source of luminance according to the imaging channel having the highest magnification in the said area, or
2. Comparing the sharpness of each area or detail in the three imaging channels and choosing the sharpest one as the source of luminance, or
3. Using the image of the imaging channel that includes a white channel.

A smart algorithm can choose to use one of the above three methods for computing the luminance matrix by determining the amount of light in a scene. The amount of light can be estimated by the exposure time and the signals or average signal in the image of one or more imaging channels.

In case of low lighting conditions it is preferred to use the third method of creating the luminance matrix using the white channel only as this channel will demonstrate a higher signal-to-noise ratio which leads to lower noise in the final image. The decision can be done on a global level or on a pixel or area level allowing the use of information from all four imaging channels for creating the luminance matrix. In this case the luminance of bright areas in the scene will be created using one of the three color channels and luminance at darker areas will be created using information from the white channel. In both cases a chrominance matrix is also created using the distortion-corrected upscaled images of the three imaging channels or using the four channels. The luminance and chrominance matrix contain sufficient information as a color image.

A camera system with 2 imaging channels can include filters that use the same spectrum. One of the imaging channels can be designed to have higher magnification at the central area of the image and the other imaging channel can be designed to have higher magnification at the peripheral area of the image. The higher magnification is introduced by geometrically distorting portions of the image captured by each lens.

Figure 10:
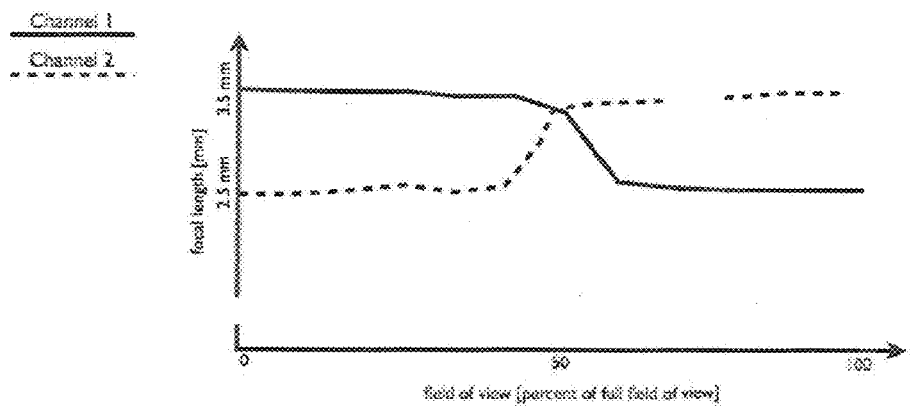
FIG. 10 illustrates the focal length variation as a function of field of view for a two lens camera system, according to one example embodiment.

FIG. 10 illustrates the focal length variation as a function of field of view for the two lenses of the third embodiment. As seen in FIG. 10, at any given field of view, at least one imaging channel images a scene with a higher focal length and accordingly, higher magnification.

After capturing the images or during image readout, images captured by each lens are corrected for distortion and upscaled by a factor greater than 1. A combined image is then created according to one of the two methods:

1. At each area of the final image that can be one or more pixels in size, the source image is chosen from one of the two imaging channels according to predefined table that for each area selects the source image according to the imaging channel having the highest magnification in the said area, or
2. Comparing sharpness of each area or detail in the two imaging channels and choosing the sharpest one as the source.

Figure 11:
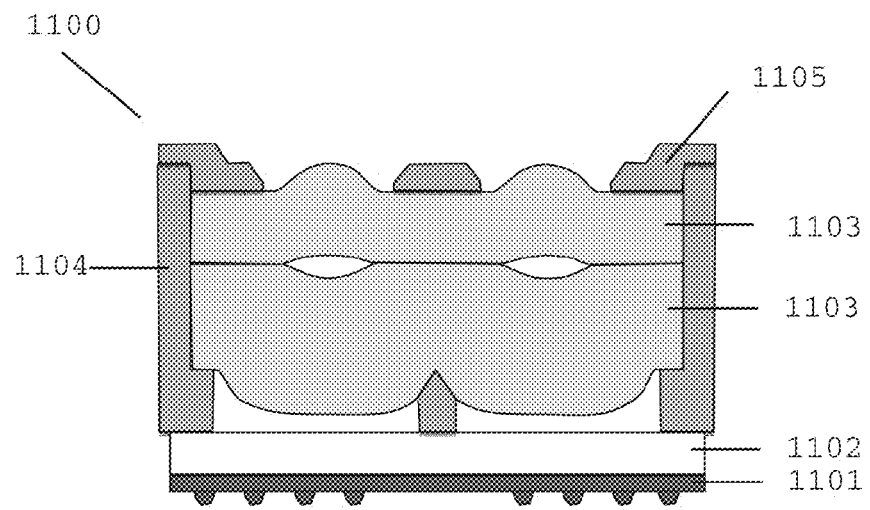
FIG. 11 illustrates an embodiment of a section of a multi-lens digital camera, according to one example embodiment.

FIG. 11 illustrates an embodiment of a section of multi aperture digital camera, i.e. a lens package 1100. The lens package 1100 comprises an image capturing element 1101, e.g. a Charge Coupled imaging Device (CCD) or a CMOS imaging device (the "image sensor" herein). In general such an image capturing element 1101 is referred to as a solid-state image sensor (SSIS). The image capturing element 1101 converts optical images of the subject formed by the lens elements of the lens array 1103 into an image signal (data). The image capturing element 1101 is mounted on a substrate (not shown) and comprises a cover 1102 for protecting the sensor against the environment. The lens array 1103 is housed in a lens holder 104, and the lens holder 1104 is provided with a cover plate 1105. The lens holder 1104 has the function of a spacer as well, because the lens array 1103 is supported by the lens holder 1104. The height of this support determines for a dominant part the distance between the lens array 1103 and the sensor 1101. The cover plate may include optionally baffle. Light falls into the cover plate 1105 and travels through the lens array 1103 to the sensor 1101. The individual parts may be bonded by an adhesive layer (not shown). Preferably, the one or more adhesive layers are rim-shaped, the adhesive material being present outside an area coinciding with the projection of the circumference of the lens elements present in the lens array.

Figure 12:
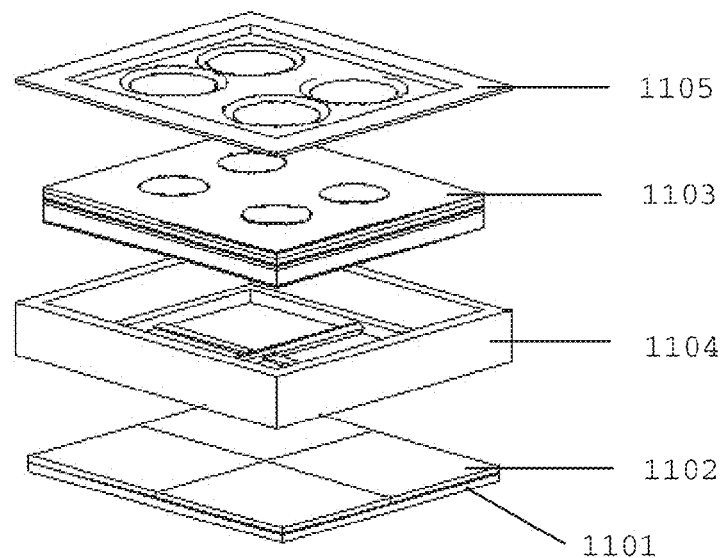
FIG. 12 illustrates an exploded view of the individual camera components shown in FIG. 11, according to one example embodiment.

FIG. 12 illustrates an exploded view of the individual parts shown in FIG. 11.

Figure 13:
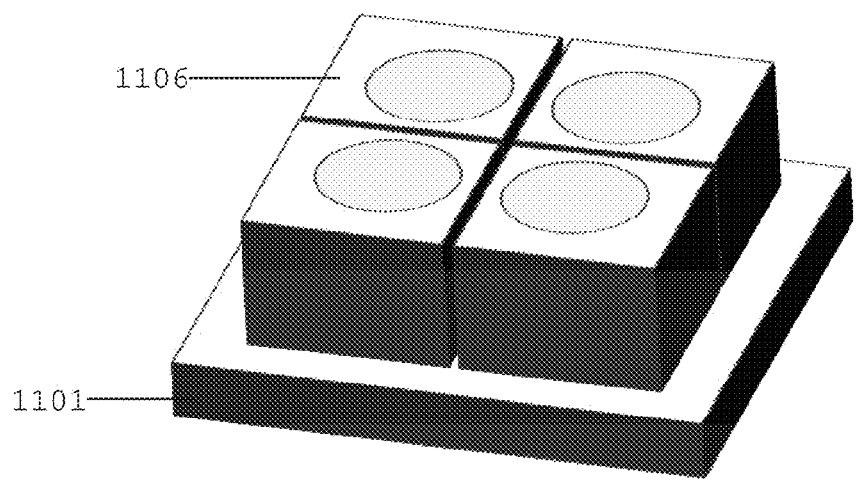
FIG. 13A illustrates individual lens elements in a 2×2 lens array, according to one example embodiment.
FIG. 13B illustrates a top view of the 2×2 lens array shown in FIG. 13A, according to one example embodiment.
Figure 13:
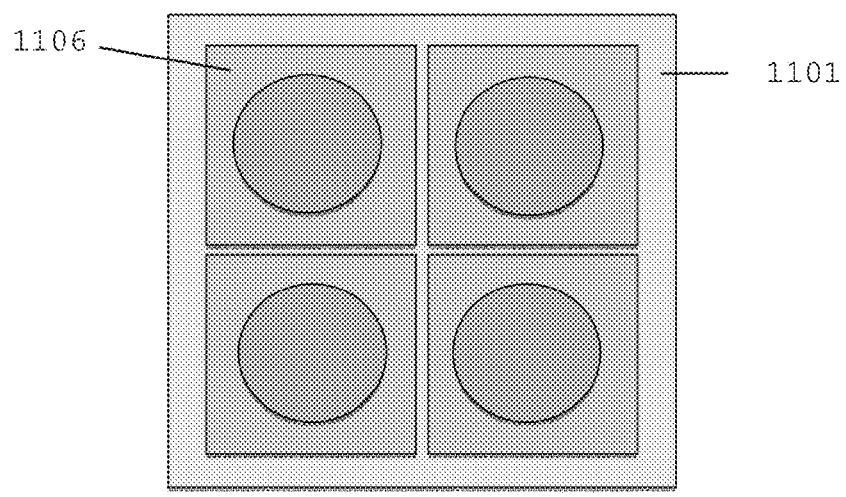

FIG. 13A illustrates individual lens elements 1106 in a 2×2 array placed on a sensor 1101.

FIG. 13B illustrates a top view of the 2×2 array shown in FIG. 13A.

Figure 14:
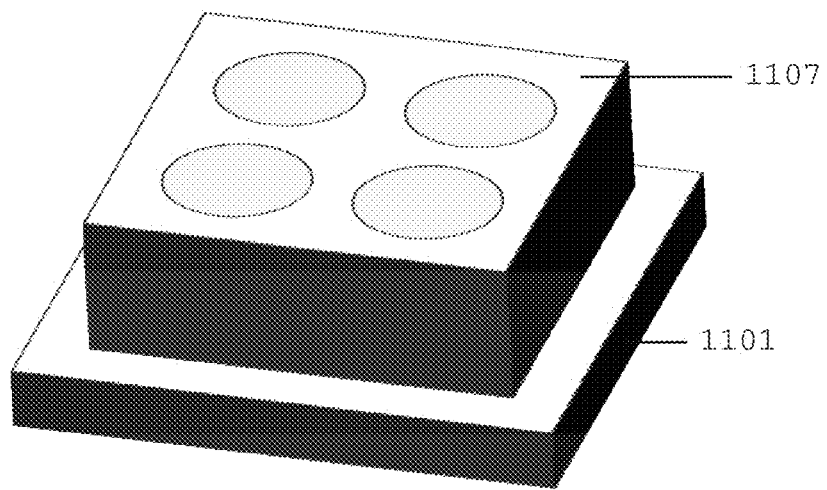
FIG. 14A illustrates one lens element in a 2×2 lens array integrated lens element, according to one example embodiment.
FIG. 14B illustrates a top view of the integrated 2×2 lens array shown in FIG. 14A, according to one example embodiment.
Figure 14:
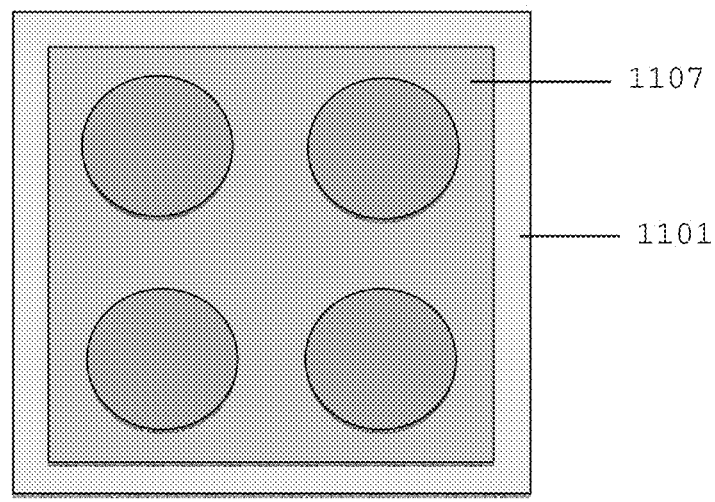

FIG. 14A illustrates one lens element 1107 in a 2×2 array, i.e. a 2×2 integrated lens element placed on a sensor.

FIG. 14B illustrates a top view of the integrated 2×2 array shown in FIG. 14A.

The present invention is not restricted to a 2×2 array construction. Any N×M configuration of lenses can be used as well according to principles described herein.

FIGS. 15A, 16A, and 17A, 18, 19 illustrate a construction of different sizes of the lenses 1106 in a lens array.

Figure 15:
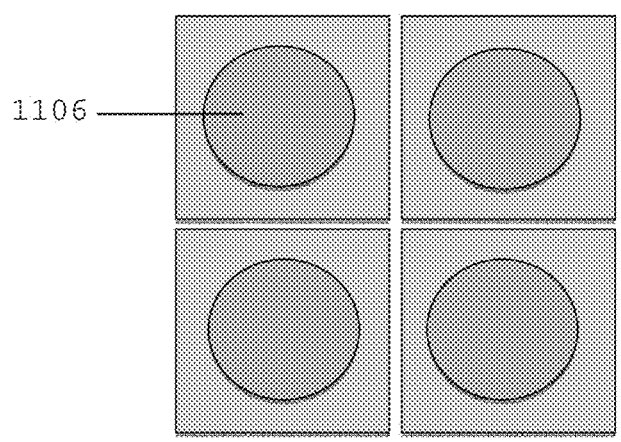
FIGS. 15A, 16A, 17A, 18, and 19 illustrate various multi-lens arrays, according to one example embodiment.
FIGS. 15B, 16B, and 17B illustrate image sensors for use with the multi-lens arrays of FIGS. 15A, 16A, and 17A, respectively, according to one example embodiment.
Figure 15:
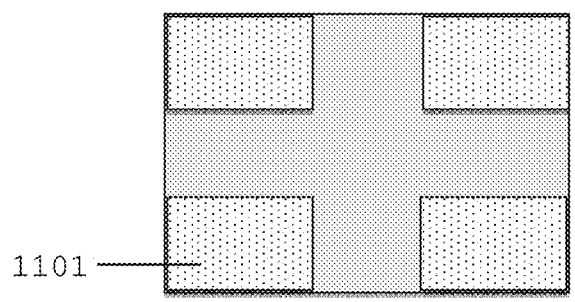
Figure 16:
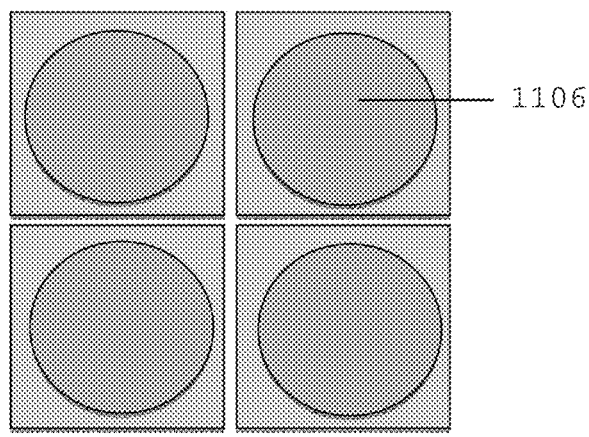
Figure 16:
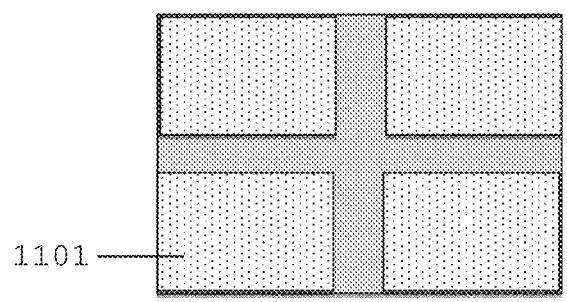
Figure 17:
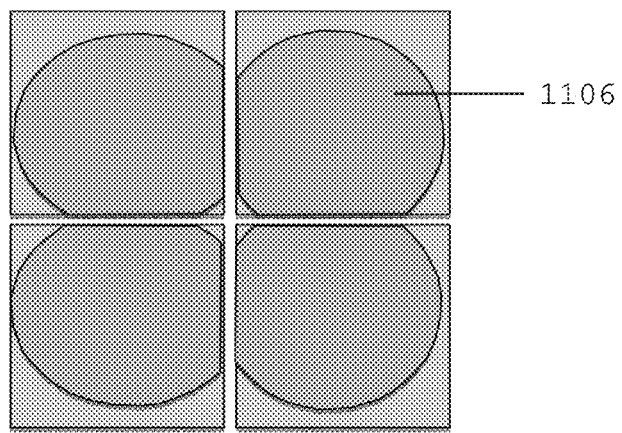
Figure 17:
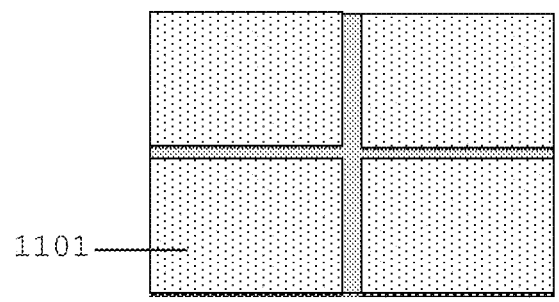
Figure 18:
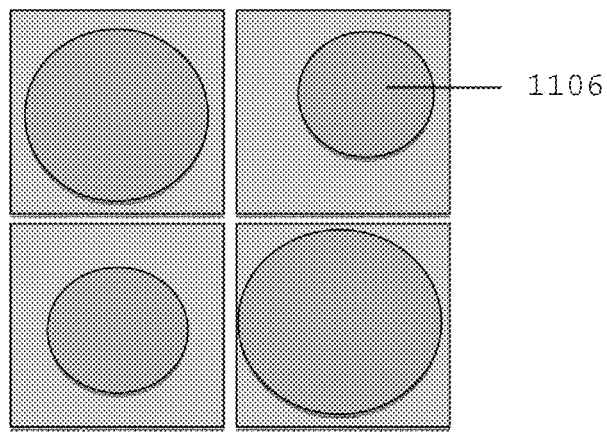
Figure 19:
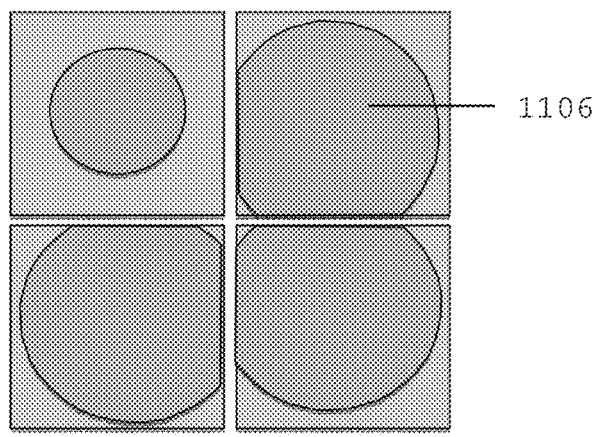

FIGS. 15B, 16B, and 17B illustrate the sensors 1101 to be used in connection with the lenses shown in FIGS. 15A, 16A, and 17A, respectively.

Figure 20:
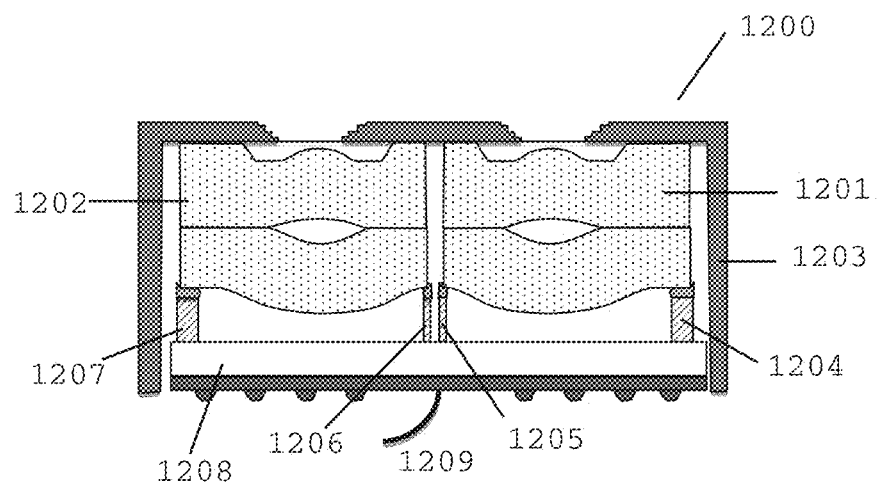
FIGS. 20, 21, 22, and 23 illustrate multi-lens camera components, according to one example embodiment.

FIG. 20 illustrates another embodiment of a section of multi aperture digital camera, i.e. a lens package 1200. Individual arrays 1201, 1202 comprising lens elements are positioned within a housing 1203, and spacers 1204, 1205, 1206, 1207 are located on the sensor cover 1208 mounted on sensor 1209. The bonding between the spacers 1204, 1205, 1206, 1207 and the sensor cover 1208 is through an adhesive. An adhesive is also present between the spacers 1204, 1205, 1206, 1207 and the respective arrays 1201, 1202.

Figure 21:
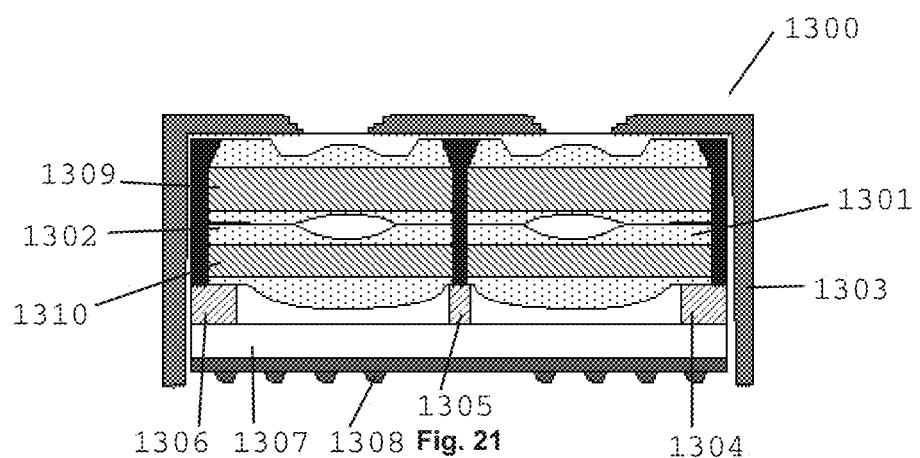

FIG. 21 illustrates another embodiment of a section of multi aperture digital camera, i.e. a lens package 1300. Individual arrays 1301, 1302 comprising lens elements are positioned within a housing 1303, and spacers 1304, 1305, 1306 are located on the sensor cover 1307 being mounted on sensor 1308. The bonding between the spacers 1304, 1305, 1306 and the sensor cover 1307 is through an adhesive. An adhesive is also present between the spacers 1304, 1305, 1306 and the arrays 1301, 1302. The polymer based lens elements are provided on transparant substrates 1309, 1310 via replication technology. Examples of transparent substrates are glass, polymers, quartz, ceramics, sapphire, crystalline alumina, Yttria, yttrium aluminium garnet (YAG). The lens package 1300 also includes light-shielding walls for preventing crosstalk between light beams passing through adjacent lens elements of the lens array 1301, 1302. The replicated lenses may be provided with one ore more additional layers, such as color filters, diaphragms, infra red reflecting layers, and anti reflection layers (not shown). These additional layers can be present between the substrates 1309, 1310 and the lens element replicated thereon. The lens elements of the lens array 1301, 1302 can have different shapes, thicknesses, air space thicknesses, polymer materials and aperture dimensions.

Figure 22:
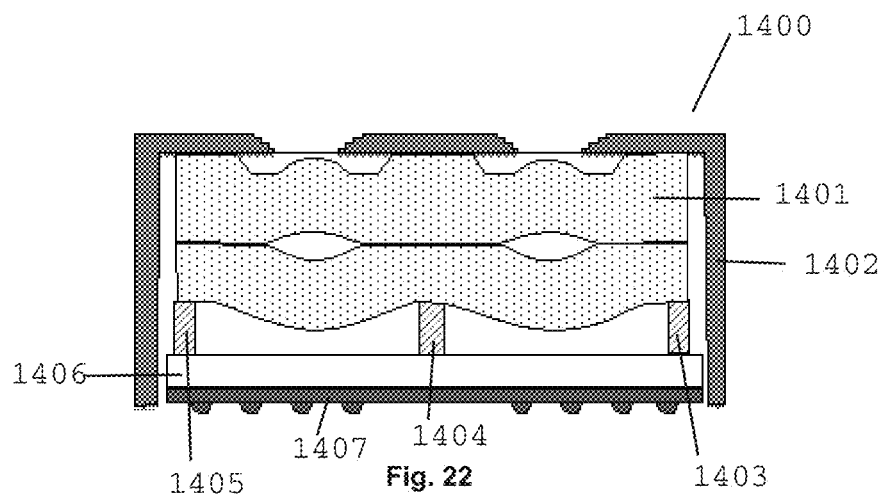

FIG. 22 illustrates another embodiment of a section of multi aperture digital camera, i.e. a lens package 1400. Array 1401 comprising lens elements is positioned within a housing 1402, and spacers 1403, 1404, 1405 are located on the sensor cover 1406 being mounted on sensor 1407. The bonding between the spacers 1403, 1404, 1405 and the sensor cover 1406 is through an adhesive. An adhesive is also present between the spacers 1403, 1404, 1405 and the array 1401.

Figure 23:
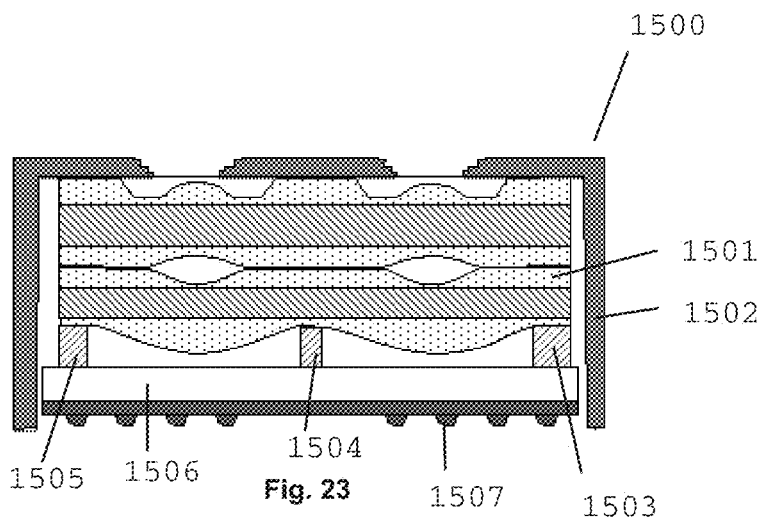

FIG. 23 illustrates another embodiment of a section of multi aperture digital camera, i.e. a lens package 1500. Array 1501 comprising lens elements is positioned within a housing 1502, and spacers 1503, 1504, 1505 are located on the sensor cover 1506 being mounted on sensor 1507. The bonding between the spacers 1503, 1504, 1505 and the sensor cover 1506 is through an adhesive. An adhesive is also present between the spacers 1503, 1504, 1505 and the array 1501. The polymer based lens elements are provided on transparant substrates 1508, 1509 via replication technology. Examples of transparant substrates are glass, polymers, quartz, ceramics, sapphire, crystalline alumina, Yttria, yttrium aluminium garnet (YAG).

The replica layer used in the present system can be composed of a UV curable polymer, selected from the group of polycarbonates, polystyrenes, poly(meth)acrylates, polyurethanes, polyamids, polyimide, polyethers, polyepoxides and polyesters. A replica layer is obtained by using a replication method in which use is made of a mould having a precisely defined surface, for example an aspherical surface, wherein a small amount of a radiation-curable resin, for example a UV curable resin, is applied to the mould surface. Subsequently, the resin is spread over the mould surface, so that the cavities present in the mould are filled with the resin, whereupon the whole is subsequently irradiated for curing the resin and the thus cured product is removed from the mould. The cured product is a negative of the mould surface. An advantage of the replication process is that lenses having an intricate refractive surface, such as an aspherical surface, can be produced in simple manner, without complicated processes of grinding and polishing the lens body being required. In addition to that, the replica layer is durably joined to the surface to which the replica layer is applied, without adhesives being used. In addition, there is no occurrence of so-called "air gaps", which lead to large refractive index transitions between the surface and the air layer that is present.

Suitable UV curable compositions are: polycarbonates, including diethylene glycolbis-(allyl)carbonate, polystyrenes, including polychlorine styrene, polyacrylates, such as poly(trifluoroethyl methacrylate), poly(isobutyl methacrylate), poly(methylacrylate), poly(methyl methacrylate), poly (alphamethyl bromium acrylate), poly(methacrylic acid)-2, 3-dibromium propylpoly(phenyl methacrylate poly (pentachlorine phenyl-methacrylate polymer), polyester compounds such as diallylphthalate, poly(vinyl-benzoate), poly(vinylnaphthalene), poly(vinylcarbazole) and silicones in the form of various types of resin materials, as well as acrylic resin, urethane resin, epoxy resin, enthiol resin or thiourethane resin or photopolymer.

Exposure preferably takes place with an intensity of between 100 en 2000 W/cm<2>, in particular 700 W/cm<2>, and a dose of 1-15 J/cm<2>, in particular 7 J/cm<2>, a wavelength in the 320-400 nm range and an exposure time of 1-60 seconds, in particular 10 seconds.

Suitable UV curable adhesive compositions include GAF-GARD233 (marketed by DuPont, type vinylpyrrolidone), Norland Inc. NOA-61, NOA-63, NOA-65, Three bond AVR-100 and Sony Chemical UV-1003, possibly provided with the usual additives such as initiators, reactive or non-reactive dilutants, crosslinking agents, fillers, pigments and anti-shrinkage agents.

Spacers mentioned in the Figs. are made of a rigid material, for example glass, silicon or a composite material such as FR4. In an embodiment the spacer plate is so configured that it will not interfere with the light path through the two separate lens elements, The spacer plate comprises an opening which is positioned coaxially with a main optical axis of the lens element in question, whilst in a special embodiment the side of said opening is provided with an anti-reflective coating.

The color filters, Infrared blocking filters, apertures and antireflection coatings on the substrates or lens surfaces can be manufactured according to well known industrial processes, like coating processes chemical vapor deposition, physical vapor deposition.

Suitable technologies regarding a multi-aperture camera through assembling discrete optical elements, lens housing and optical blocking structures are disclosed in U.S. Patent Publication Nos. 2010/0127157 and US2010/0039713. These documents are incorporated by reference herein. The optical elements can be manufactured through injection molding, glass molding of a thermoplast, or by pressing a glass preshape in a single cavity or plural cavity mold.

Suitable technologies for manufacturing coverplates lens holders for wafer level optics camera are disclosed in U.S. Patent Publication Nos. 2010/0052192, 2009/0321861, and 2010/0117176, which are incorporated by reference herein.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A digital image capture device, comprising:
a first image sensor and a first lens system having a first geometric distortion that distorts a first portion of a first field of view more than a second portion of the first field of view and that is configured to direct light from a scene onto the first image sensor;
a second image sensor and a second lens system having a second geometric distortion that distorts a first portion of a second field of view more than a second portion of the second field of view and that is configured to direct light from the scene onto the second image sensor; and
memory coupled to the first and second image sensors;
wherein the digital image capture device is configured to:
capture a first image of the scene with the first geometric distortion using the first image sensor and the first lens system;
capture a second image of the scene with the second geometric distortion using the second image sensor and the second lens system;
combine the first and the second images to generate a third image with a higher resolution than both the first and the second images, wherein the third image includes the first portion of the first field of view from the first image and the first portion of the second field of view from the second image; and
store the third image in the memory.

2. The digital image capture device of claim 1, wherein the first image sensor and the second image sensor comprise a first and a second portions of a single image sensor element.

3. The digital image capture device of claim 1, wherein the first lens system has a first depth-of-field at a first focus distance and the second lens system has a second depth-of-field at the first focus distance.

4. The digital image capture device of claim 1, wherein the first image and the second image each capture the entire scene, and wherein the digital image capture device is further configured to magnify different portions of the entire scene based on the first and the second geometric distortions.

5. The digital image capture device of claim 1, wherein the distorted first portion of the first field of view provides a magnification of the first portion of the first field of view from the first image, and wherein the distorted first portion of the second field of view provides a magnification of the first portion of the second field of view from the second image.

6. The digital image capture device of claim 1, wherein the first portion of the first field of view from the first image has a higher magnification than the second portion of the first field of view from the first image due, at least in part, to the first geometric distortion.

7. The digital image capture device of claim 6, wherein the first portion of the second field of view from the second image has a higher magnification than the second portion of the second field of view from the second image due, at least in part, to second geometric distortion.

8. A multi-lens camera system, comprising:
a first lens system associated with a first geometric distortion that distorts a first portion of a first field of view more than a second portion of the first field of view and that is coupled to a first image sensor; and
a second lens system associated with a second geometric distortion that distorts a first portion of a second field of view more than a second portion of the second field of view and that is coupled to a second image sensor;
wherein the multi-lens camera system is adapted to
capture a first image of a scene using the first image sensor and the first geometric distortion of the first lens system;
capture a second image of the scene using the second image sensor and the second geometric distortion of the second lens system;
combine the first and the second images to construct a third image with a higher resolution than both the first and the second images, wherein the third image includes the first portion of the first field of view from the first image and the first portion of the second field of view from the second image; and
store the third image into a memory.

9. The multi-lens camera system of claim 8, wherein the first image sensor and the second image sensor comprise first and second portions of a single image sensor element.

10. The multi-lens camera system of claim 8, wherein the first lens system has a first depth-of-field at a first focus distance and the second lens system has a second depth-of-field at the first focus distance.

11. The multi-lens camera system of claim 8, wherein the first image and the second image each capture the entire scene, and wherein the multi-lens camera system is further adapted to magnify different portions of the entire scene based on the first and the second geometric distortions.

12. The multi-lens camera system of claim 8, wherein the distorted first portion of the first field of view provides a magnification of the first portion of the first field of view from the first image, and wherein the distorted first portion of the second field of view provides a magnification of the first portion of the second field of view from the second image.

13. The multi-lens camera system of claim 8, wherein the first portion of the first field of view from the first image has a higher resolution than the second portion of the first field of view from the first image due, at least in part, the first geometric distortion, and wherein the first portion of the second field of view from the second image has a higher resolution than the second portion of the second field of view from the second image due, at least in part, to the second geometric distortion.

14. A multi-lens image capture method, comprising:
- capturing first image of a scene using a first lens system that includes: a first geometric distortion that distorts a first portion of a first field of view more than a second portion of the first field of view; and a corresponding first image sensor;
- capturing a second image of the scene using a second lens system that includes: a second geometric distortion that distorts a first portion of a second field of view more than a second portion of the second field of view; and a corresponding second image sensor;
- combining the first and the second images to generate a third image with a higher resolution than both the first and the second images, wherein the third image includes the first portion of the first field of view from the first image and the first portion of the second field of view from the second image; and
- storing the third image into a memory.

15. The method of claim 14, wherein the first image sensor and the second image sensor comprise first and second portions of a single image sensor element.

16. The method of claim 14, wherein the first lens system has a first depth-of-field at a first focus distance and the second lens system has a second depth-of-field at the first focus distance.

17. The method of claim 14, further comprising magnifying different portions of the scene based on the first and the second geometric distortions.

18. The method of claim 14, wherein the distorted first portion of the first field of view provides a magnification of the first portion of the first field of view from the first image, and wherein the distorted first portion of the second field of view provides a magnification of the second portion of the second field of view from the second image.

19. The method of claim 14, wherein the first portion of the first field of view from the first image has a higher magnification than the second portion of the first field of view from the first image due, at least in part, to the first geometric distortion.

20. The method of claim 19, wherein the first portion of the second field of view from the second image has a higher magnification than the second portion of the second field of view from the second image due, at least in part, to the second geometric distortion.

* * * * *